Patented Aug. 10, 1954

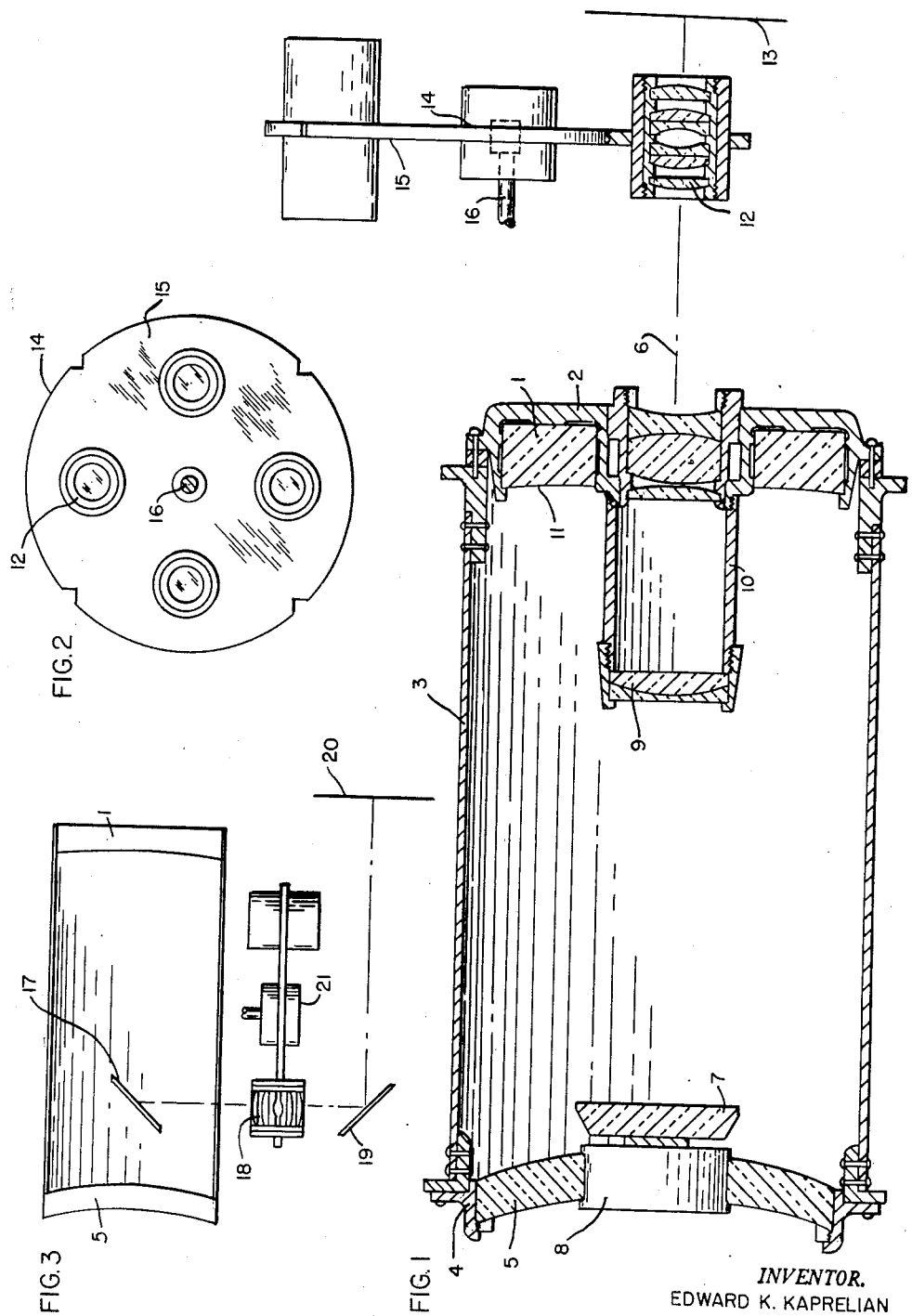

2,685,820

UNITED STATES PATENT OFFICE 2,685,820

IMAGING OPTICAL SYSTEM OF THE SCHMIDT TYPE

Edward K. Kaprelian, Long Branch, N. J., assignor to the United States of America as represented by the Secretary of the Army Application May 3, 1951, Serial No. 224,434

2 Claims. (Cl. 88—57)

(Granted under Title 35, U. S. Code, (1952), sec. 266)

The invention described herein may be manufactured and used by or for the Government for governmental purposes, without the payment of any royalty thereon.

This invention relates to optical imaging systems and particularly to such systems adjustable to function at a plurality of focal lengths.

The invention correlates two sections of a compounded optical system in a manner to hold to a minimum errors which have heretofore been present in such systems. The invention also creates the highly desirable facility for developing a system wherein a reimaging element thereof is readily interchangeable to produce a series of compounded systems of different focal lengths.

To achieve this desirable result, advantage is taken of the favorable properties of a corrected long focus primary imaging system wherein the bending of the light rays is at a minimum and combining this primary system with other systems of shorter focal length and capable of reimaging the primary image to produce a final secondary image of high quality.

A further refinement is achieved by compounding a primary and a series of reimaging systems having certain characteristics. For example, it is known that lens systems can readily be produced which have a slightly curved field, with practically no astigmatism. The invention provides a primary system of the above suggested type which is combined with a reimaging system which produces a curvature of field opposite to that of the primary image, whereby all curvature of field is cancelled out and a final image is produced having a super corrected quality.

The invention may be used in many types of telescopic or photographic apparatus and is herein presented in a form particularly suited to a long focus system for use in a theodolite or other similar apparatus.

By utilizing a reflecting type of imaging element for the primary section of the device, such as a Schmidt or Maksutov system, an extremely long focus but very compact arrangement is achieved. Such an arrangement is well suited for use in a theodolite. Moreover, the ability to quickly change focal lengths greatly increases the effectiveness of the apparatus.

Briefly, the invention may be described as follows. A primary imaging section is employed having relatively long focal length and of the type conventionally termed a reflecting system having a concave mirror as its principal element and including a refracting corrective element. This section of the system produces a highly corrected image which is reimaged in another plane by a refracting projecting lens system of relatively short focal length.

To increase the scope of the whole system, a plurality of reimaging lenses are provided and mounted in a turret so designed that any lens may be readily placed in reimaging position with respect to the primary system, thereby to produce an image in a common designated plane at a selected magnification.

It is a primary object of the invention to provide a highly corrected optical imaging system of extreme adaptability and flexibility of operation.

A further object of the invention is to provide an imaging system in which a high degree of definition may be obtained at a plurality of magnifications.

A further object of the invention is to provide an imaging optical system in which corrections can be carried to a high degree of refinement.

A still further object of the invention is to provide a telescopic imaging system of variable focal length in which two optical systems of different types are combined and in which the errors which are difficult to correct in one section of the system counteract the hard to correct errors in the other section of the system.

Other objects and features of the invention will more fully appear from the following description and will be particularly pointed out in the claims.

To provide a better understanding of the invention, a particular embodiment thereof will be described and illustrated in the accompanying drawings in which Fig. 1 is a cross-sectional view illustrating a preferred form of the invention;

Fig. 2 is a detailed view of the mechanism which is operable to change the focal length of the system; and Fig. 3 is a diagrammatic view of a different embodiment of the invention.

By way of example, the invention is shown herein as a compound imaging optical system having a primary section and a secondary or reimaging system. The primary system follows the type of imaging means wherein a spherical mirror of appropriate focal length is used as the principal image forming element and in which a refracting element is used as a correcting means.

The secondary, or reimaging system, may be a conventional photographic anastigmat, or it may be designed to correct the slightly spherical form of image characteristic of the above type of primary system. In the latter case, the reimaging system may readily be designed to cooperate with the primary system to form a final image of extremely high resolving power. This high quality image results from the fact that in the design of lens systems in general, many of the critical corrections which must be made are very closely interrelated to the correction of curvature of the field and as a result certain compromises and relatively complicated combinations of elements are required to produce a corrected objective having a truly flat field.

In the present instance, a reimaging objective can be designed having a slightly curved field which is opposite in curvature to that of the image produced by the primary system. Thus, the curvature of one system cancels that of the other to form a flat field. Such a combination produces an extremely high quality image. Morevore, the corrections in the reimaging system may be carried to great precision in a lens having a slightly curved field. Thus, the final result of compounding the two image systems creates an overall lens system capable of resolving a maximum of lines per millimeter.

The image system shown in the drawings has a modified Maksutov primary section having a spherical concave mirror 1, which is rigidly secured to a supporting member 2, which in turn is secured to a cylindrical casing 3. The other end of this casing has secured thereto a supporting element 4, within which is secured a transparent meniscus correction lens 5, the axis of which is accurately aligned with that of the mirror 1 and both are situated upon the common axis 6 of the complete system.

The third element of the primary lens system is a small convex mirror 7 situated adjacent to the lens 5 and aligned with the axis 6 and having its reflecting surface facing the mirror 1. The design of this unit is such that the mirror 7 may be rigidly secured to the center of the inner face of the lens 5. To insure maximum rigidity of the parts, the lens 5 is provided with a central bore within which is rigidly fastened a supporting structure 8 to which the mirror 7 is attached.

The supporting member 2, for the mirror 1, is provided with a central opening within which is received a field lens system 9 mounted in the tube 10 having its axis situated accurately upon the common axis 6. Light rays coming from the subject first pass through the lens 5, traversing the casing 3 and strike upon the reflecting surface 11 of the mirror 1 and are reflected and converged upon the mirror 7, from where the rays are reflected and converged upon the field lens 9. The light rays emerge from the lens 9 and are picked up and reimaged by the reimaging lens system 12 which is accurately aligned upon the axis 6. The resulting image falls upon a plane 13. The final image formed by the reimaging system 12 has a focal length determined by the combined length of both the primary and reimaging systems. To change the focal length or power of the compounded system, another reimaging lens may be substituted for the lens 12. The substituted lens has a different focal length than the lens 12 and desirably is so situated that it will reimage the primary image upon the plane 13. The use of the substituted lens changes the overall focal length of the compounded system to fulfill the requirement for a change in the power of the system. It will be obvious that by interchanging a plurality of reimaging systems of various focal lengths, a plurality of working focal lengths for the system is established.

To provide a convenient and rapid means for interchanging the reimaging lenses, a plurality of reimaging lenses of different power are mounted upon a turret 14, each lens being accurately mounted upon parallel optical axes, which axes are parallel to the common axis 6.

The turret 14 is arranged to selectively position any one of the reimaging lenses into operative relation with the primary lens system. The turret is provided with a mounting disk 15 in which each of the reimaging lenses are supported. The disk 15 is mounted upon a supporting shaft 16, parallel to the axis 6. The shaft 16 is rotatably mounted in suitable bearings (not shown) which maintain the lenses in correct alignment.

There are many possible physical arrangements for the respective elements involved in the invention. In Fig. 3 of the drawings, a variation in the arrangement of the elements is shown wherein the primary section of the system is provided with an angularly disposed mirror 17 which reflects the light rays from the mirror 1 to a reimaging lens 18, from where the rays are again reflected by an angular mirror 19 to the final focal plane 20. It will be observed that a turret 21 may be provided for interchanging the reimaging lenses of this system.

It will be noted that the invention provides an extremely compact and flexible imaging means which is highly suitable for long range theodolites. Especially is such a system desirable for this class of work, since it is capable of resolving small objects at a maximum distance and inasmuch as it is of great compactness and minimum weight it also has the property of being very mobile and sensitive to azimuth and elevation movements, making it of great value in tracing objects which are in free flight.

What is claimed is:

1. An imaging optical system the components of which lie upon a common axis and comprising a primary large aperture imaging system having a refracting correcting element thru which incident light first passes, a concave spherical main mirror remote from said correcting element, a refracting auxiliary lens assembly extending axially thru said main mirror, a secondary mirror adjacent to said correcting element acting to redirect the image from said main mirror to and thru said auxiliary lens assembly, said auxiliary lens system being designed to coact with the other elements of the said primary system to produce a highly corrected primary real image in a slightly spherical plane to the rear of said main mirror, a refracting secondary lens system axially situated on said common axis in position to reimage said primary image, said secondary lens system being designed itself to produce a corrected image on a slightly spherical image surface of opposite curvature to that of the primary image and operable to produce a highly corrected final image having a flat field.

2. An imaging optical system the components of which lie upon a common optical axis and comprising a large aperture primary imaging system having a refracting correcting element thru which incident light first passes, a concave primary spherical mirror of substantially the same diameter as said correcting element, a tubular casing in the ends of which the above elements are mounted to form a closed structure, a refracting auxiliary lens system extending axially thru said concave primary spherical mirror, a secondary spherical mirror on said common axis adjacent said correcting element, said auxiliary lens system being designed to coact with the other elements of said primary system to produce a highly corrected primary real image on a slightly spherical image surface outside of said closed structure, a refracting secondary lens system situated on said common axis in position to reimage said primary image, said secondary lens system being itself designed to produce a corrected spherical image of opposite curvature to that of said primary image and operable to produce a final highly corrected flat field image.

References Cited in the file of this patent

UNITED STATES PATENTS

| Number | Name | Date |
|---|---|---|
| 409,927 | Clements | Aug. 27, 1889 |
| 494,128 | Decker | Mar. 28, 1893 |
| 1,863,099 | Bowen | June 14, 1932 |
| 1,955,590 | Lee | Apr. 17, 1934 |
| 2,313,460 | Warmisham | Mar. 9, 1943 |
| 2,413,286 | Buchele | Dec. 31, 1946 |
| 2,430,549 | Altman | Nov. 11, 1947 |
| 2,504,383 | Bouwers et al. | Apr. 18, 1950 |
| 2,504,384 | Bouwers et al. | Apr. 18, 1950 |

FOREIGN PATENTS

| Number | Country | Date |
|---|---|---|
| 82,671 | Germany | Aug. 7, 1895 |
| 776,759 | France | Nov. 8, 1934 |
| 544,694 | Great Britain | Apr. 23, 1942 |